United States Patent
Koetter et al.

(10) Patent No.: US 6,182,996 B1
(45) Date of Patent: Feb. 6, 2001

(54) FIFTH WHEEL

(75) Inventors: Stefan Koetter, Mörfelden; Wolfgang Pohl, Dreieich; Rainer Spitz, Eltville; Josè Manuel Algëera Gallego, Aschaffenburg, all of (DE)

(73) Assignee: Jost-Werke GmbH & Co., KG. (DE)

( * ) Notice: Under 35 U.S.C. 154(b), the term of this patent shall be extended for 0 days.

(21) Appl. No.: 09/242,789

(22) PCT Filed: Jun. 24, 1998

(86) PCT No.: PCT/EP98/03916

§ 371 Date: Feb. 23, 1999

§ 102(e) Date: Feb. 23, 1999

(87) PCT Pub. No.: WO99/00288

PCT Pub. Date: Jan. 7, 1999

(30) Foreign Application Priority Data

Jun. 27, 1997 (DE) .............................................. 197 27 338

(51) Int. Cl.[7] .................................................. B62D 53/06
(52) U.S. Cl. .......................... 280/433; 384/192; 384/222
(58) Field of Search .................................... 280/433, 439, 280/440, 489, 483; 384/192, 206, 215, 220, 222, 434, 437, 438

(56) References Cited

U.S. PATENT DOCUMENTS

| 2,438,323 |   | 3/1948  | Miller  | 280/440 |
|-----------|---|---------|---------|---------|
| 3,744,859 | * | 7/1973  | Ringel  | 308/72  |
| 3,993,325 | * | 11/1976 | Gravett | 280/415 B |
| 4,017,095 | * | 4/1977  | Best    | 280/438 R |
| 4,095,856 | * | 6/1978  | Markovitz | 308/29 |
| 4,199,168 | * | 4/1980  | Bush et al. | 280/439 |
| 4,412,753 | * | 11/1983 | Linn    | 384/437 |
| 4,916,750 | * | 4/1990  | Scott   | 384/484 |
| 5,054,940 | * | 10/1991 | Momose et al. | 384/193 |
| 5,120,080 | * | 6/1992  | Ritter  | 280/433 |
| 5,356,167 | * | 10/1994 | Hall et al. | 280/492 |
| 5,509,682 |   | 4/1996  | Lindenman et al. | 280/440 |
| 5,765,849 | * | 6/1998  | Moulton et al. | 280/433 |
| 5,769,720 | * | 7/1998  | Aiken et al. | 464/128 |
| 5,882,028 | * | 3/1999  | Osada   | 280/439 |

FOREIGN PATENT DOCUMENTS

| 14 30 462   |   | 3/1970  | (DE) . |
| 23 03 163   |   | 9/1973  | (DE) . |
| 28 36 703   |   | 3/1979  | (DE) . |
| 3040925 C2  |   | 9/1982  | (DE) . |
| 43 22 717 A1|   | 1/1995  | (DE) . |
| 0 038 928 B1|   | 11/1981 | (EP) . |
| 0 114046 A2 |   | 7/1984  | (EP) . |
| 0 087 903 B1|   | 1/1988  | (EP) . |
| 905011 A2   | * | 3/1999  | (EP) . |

* cited by examiner

*Primary Examiner*—Brian L. Johnson
*Assistant Examiner*—Daniel Yeagley
(74) *Attorney, Agent, or Firm*—Hudak & Shunk Co., L.P.A.

(57) ABSTRACT

A fifth wheel is described with a coupling plate having elements for fastening to the vehicle frame. It is supposed to facilitate the mounting on the vehicle frame, while it should be possible to equalize manufacturing tolerances of the frame in simple fashion. The fastening elements attach to pivot pins, which are detachably arranged on the fifth wheel and project outward to the side beyond the coupling plate.

17 Claims, 6 Drawing Sheets

FIFTH WHEEL

CROSS-REFERENCE TO RELATED APPLICATION

This application claims benefit of PCT Application No. PCT/EP98/03916 filed Jun. 26, 1998 and German Application No. 19727338.6 filed Jun. 27, 1997.

BACKGROUND OF THE INVENTION

The invention concerns a fifth wheel for a truck, with a coupling plate and with means to fasten the fifth wheel to the vehicle frame in the form of two pivot pins, which are fashioned at the side at two diametrically opposite places underneath the top of the coupling plate on the fifth wheel and which project out to the side beyond the coupling plate, and which have a bearing segment and a fastening segment.

Fifth wheels are mounted in bearing pedestals, which are either an integral part of the vehicle frame or are screwed onto the vehicle frame and can swivel about a horizontal axis. The bearing pedestal is connected to the fifth wheel by bolts, which are inserted into the bearing pedestal and corresponding openings of the coupling plate. Bearing pedestals which are fastened on the vehicle frame or which are integral parts of the vehicle frame are known, for example, from EP 00 87 903 B1 and DE 43 22 717 A1. These bearing pedestals have a bearing tube, through which the bearing bolts can be inserted.

Moreover, there are fifth wheels that have pockets with inserted rubber bearings underneath the coupling plate. Here as well the fastening to the bearing pedestals is done by bearing pins, which are inserted into the side walls of the pockets and through the bearing pedestal. Such arrangements are known from DE-PS 23 03 163, DE 30 40 925 C2, EP 0 038 928, EP 0 114 046 and DE-PS 14 30 462.

All solutions have the common drawback that the fifth wheel during assembly must be oriented exactly to the frame and, thus, to the openings of the bearing pedestals before the bearing bolts can be inserted. This requires considerable assembly expense. A further disadvantage results from the manufacturing tolerances of the vehicle frame. The frame pieces and, thus, the spacing of the bearing pedestals can be of different size, so that a stable fastening of the fifth wheel cannot always be achieved without resorting to additional steps.

The drawbacks of these known designs with inserted bearing bolts or bearing pins are avoided by the above-mentioned fifth wheel with the pivot pins arranged on both sides directly on the fifth wheel, having a bearing segment and a fastening segment. The bearing segment is that part of the pivot pin which lies in the bearing pedestal. The fastening segment, instead, is responsible for mounting on the fifth wheel.

This design has become known, for example, through DE 28 36 703 A 1 and U.S. Pat. No. 3,198,548.

Through this known design, the assembly is significantly facilitated and, thus, the assembly time is shortened. The fifth wheel is lowered from above onto the vehicle frame, the pivot pins engaging with recesses of the bearing pedestal, arranged on the vehicle frame. The fifth wheel adjusts itself, without requiring additional measures. After this, the pivot pins are secured to the bearing pedestal by means of a corresponding fastening means, which shall be discussed hereafter in connection with the bearing pedestal.

Furthermore, manufacturing tolerances of the vehicle frame can be equalized. The pivot pins can be made to excess length, so that even when the frame spacing is too large a secure fastening on the bearing pedestal of the vehicle frame can be assured. If, at normal frame spacing, the pivot pins then project slightly to the outside from the bearing pedestal, this is acceptable.

In such a mounting of the fifth wheel, the fastening of the two pivot pins to the coupling plate becomes especially important, since they must convey the forces emanating from the fifth wheel plate during operation and diverted into the vehicle frame.

In the known fifth wheels, therefore, the pivot pins are joined to the fifth wheel as a single piece (material closure), in particular, welded, as specifically stated in the U.S. patent.

This type of fastening has the major disadvantage that, for applications which require different bearing bolts for the same fifth wheel plate, entire fifth wheel plates must be kept on hand with the corresponding bearing bolts each time. This circumstance increases the logistical expense, in particular, inventory is more costly, and it also prevents a modular system.

SUMMARY OF THE INVENTION

The basic purpose of the invention is to configure the above-indicated fifth wheel such that the fifth wheel can be adapted to different applications in a simple yet safe manner.

This purpose is accomplished, according to the invention, in that each pivot pin is detachably fastened to the fifth wheel in at least two places.

The detachably secured pivot pins have the advantage that the fifth wheel can be adapted by simple replacement of the pivot pins to different installation circumstances, such as different frame spacings, while using the same coupling plate each time.

The secure fastening of the pivot pin with respect to the forces occurring is assured in that the pivot pin is fastened to at least two places on the fifth wheel. Preferably, according to a further development of the invention, the fastening segment is screwed to the fifth wheel at its front end and additionally held in the fifth wheel at its end near the bearing segment.

In order to achieve a deep installation position of the fifth wheel, according to one configuration of the invention the fastening segment and the bearing segment of the pivot pin can be offset from each other. This also opens up the possibility of securing the fastening segment at the point of the fifth wheel where an appropriate stability exists.

The pivot pin can have a cylindrical shape. Other configurations are also possible, but one must adapt to the particular bearing pedestals.

Preferably, the pivot pin carries a bushing, which can consist of a plastic material having especially good sliding properties. Preferably, bushing material and pivot material are attuned to each other in respect of a good slide fitting.

According to another embodiment, the bushing can carry a rubber insert on its outside, which creates an elastic mounting. When fastening the pivot pin, the rubber insert is compressed, producing tension on the pivot pin. It is also possible to equalize manufacturing tolerances with this design. The bushing with the rubber insert can also be preassembled on the pivot pin.

The pivot pin can also carry a spherical or ball-shaped extruded part, which interacts with a corresponding mate in the bearing.

According to another embodiment, the pivot pin can have a round end surface, which has the advantage that no additional extruded part is needed, since the pivot pin is salient with respect to the counterpart of the bearing.

Moreover, the ball-shaped bearing is well suited to compensate for twisting of the vehicle frame.

The bearing pedestal mounted on the vehicle frame and intended to accommodate the fifth wheel according to the invention is characterized in that it has a bottom piece with a recess on top and at least one holding element detachably secured to the bottom piece. The recess is preferably adapted to the shape of the pivot pin of the fifth wheel, so that a swivel bearing is achieved. Therefore, the recess is preferably semicircular in shape.

The recess can also have a different configuration, if, for example, the pivot pin of the fifth wheel is enclosed in an elastic material, which allows a limited swinging of the fifth wheel.

The holding element for fastening the pivot pin can be a half-clip, which is placed on the pivot pin and secured to the lower piece of the bearing pedestal after the fifth wheel is mounted.

According to another embodiment, the holding element can be a bearing cap embracing the pivot pin, which is secured to the bearing pedestal during assembly. The bearing cap preferably has an inner contour adapted to the shape of the pivot pin. The outer contour of the bearing cap is adapted to the recess of the bearing pedestal, so that a form-fitting connection to the bearing pedestal can be created.

The bearing cap, which likewise can be preassembled, can carry a bushing with a spherical or ball-shaped surface, which interacts with the spherical or ball-shaped extruded part of the pivot.

Sample embodiments of the invention shall be explained more closely hereafter by means of the drawings.

DETAIL DESCRIPTION OF THE INVENTION

Figure 1:
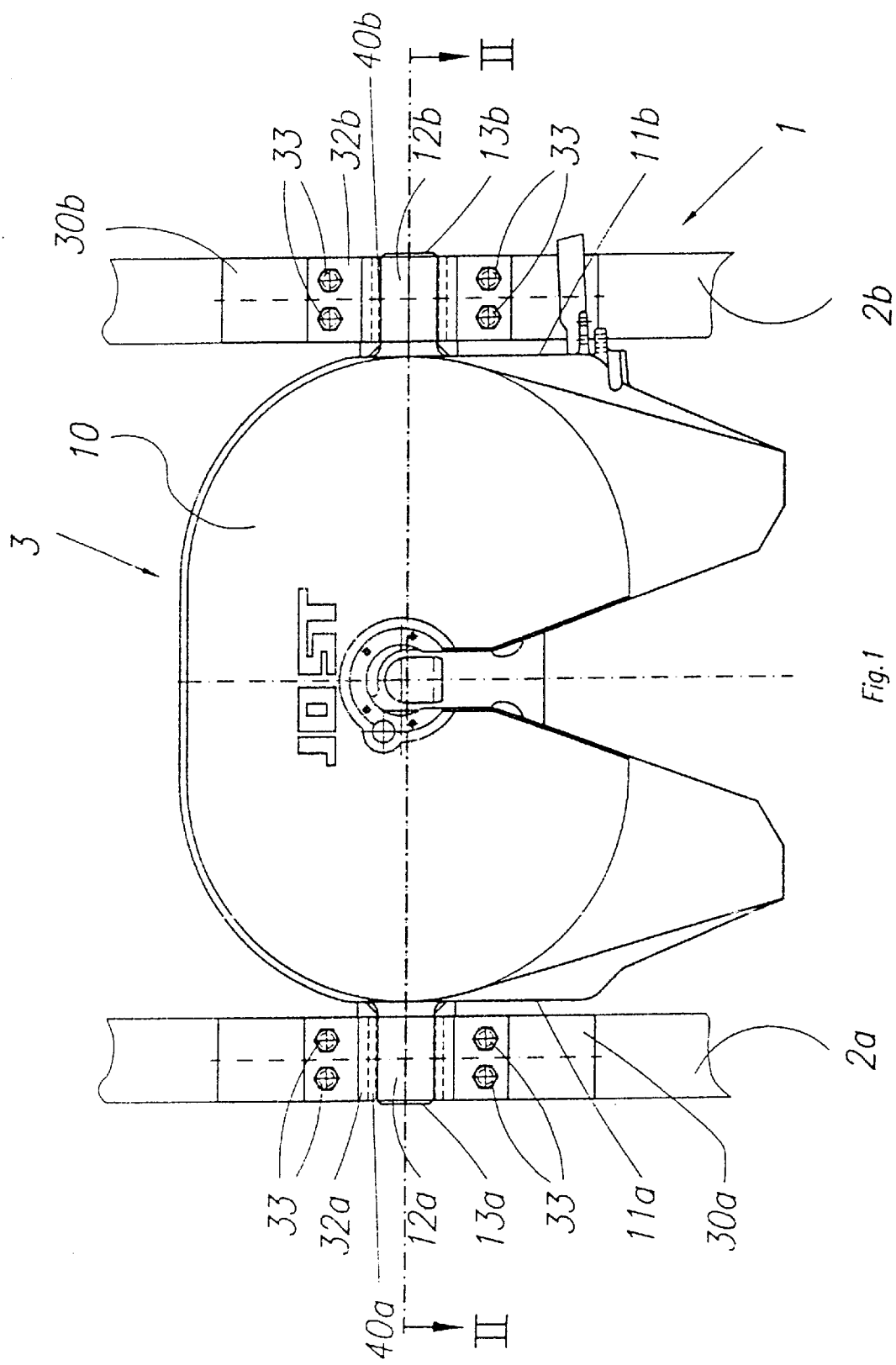
FIG. 1, a top view of a fifth wheel mounted on the vehicle frame.

FIG. 1 shows a fifth wheel 3 in top view, of which basically the coupling plate 10 is seen. At the opposite side surfaces 11a and 11b, outwardly projecting pivot pins 12a,b are detachably mounted, being cylindrical in shape in the embodiment shown here. The pivot pins 12a,b lie on bearing pedestals 30a,b, which are mounted on longitudinal beams 2a,b of a vehicle frame 1. The bearing pedestals 30a,b each have a recess 34 in their bottom piece 31, in which the pivot pin 12a,b engages when assembled (see FIG. 3). The pivot pins 12a,b are secured according to the embodiment shown in FIG. 3 by means of a half-clip 32a,b, which forms the top of the bearing pedestal 30a,b. By means of screws 33, the half-clip 32a,b is fastened to the bottom piece 31 of the bearing pedestal 30a,b.

As can be seen in FIG. 1, the length of the pivot pins 12a,b is adapted to the width of the longitudinal beams 2a,b and, thus, to the length of the recesses 34 of the bearing pedestal. In the depiction of FIG. 1, the pivot pins 12a,b project slightly outward by their end faces 13a,b from the outside of the bearing pedestal 30a,b. Manufacturing tolerances, such as different spacings of the longitudinal beams 2a,b, are equalized by the pivot pins 12a,b in that these might not lie across the entire length of the recesses 34a,b. On the other hand, it can be possible to configure the pivot pins 12a,b longer than the bearing pedestals are broad or their recesses 34 are long. In this case, the pivot pins 12a,b would project noticeably outward from the bearing pedestals 30a,b.

Figure 2:
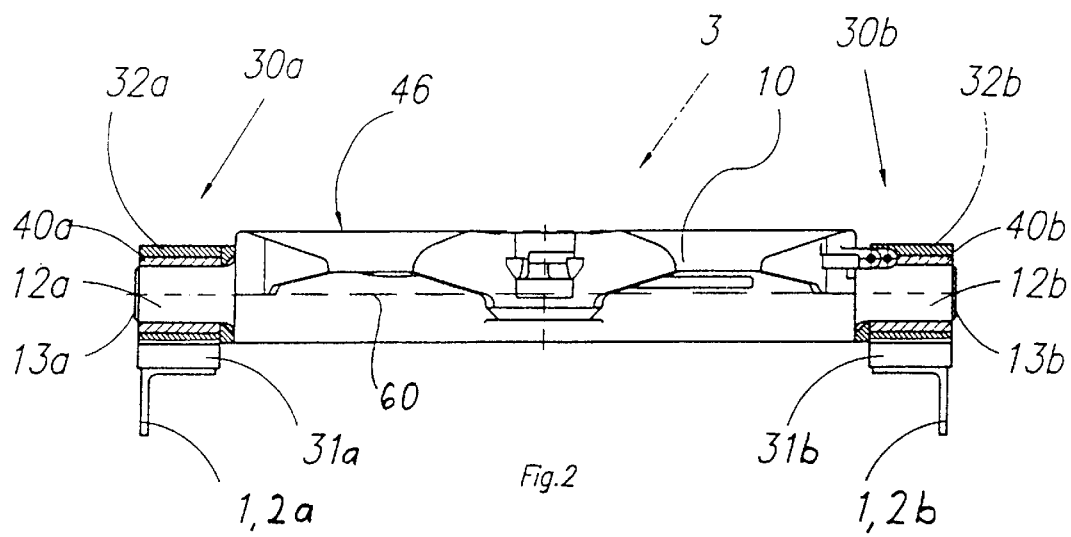
FIG. 2, a section along line II—II of the layout in FIG. 1.

FIG. 2 shows a cross section along line II—II of the arrangement in FIG. 1. It can be clearly seen that the bearing pedestals 30a,b are arranged only slightly beneath the top 46 of the coupling plate 10. This achieves a deep installation position of the fifth wheel 3.

Figure 3:
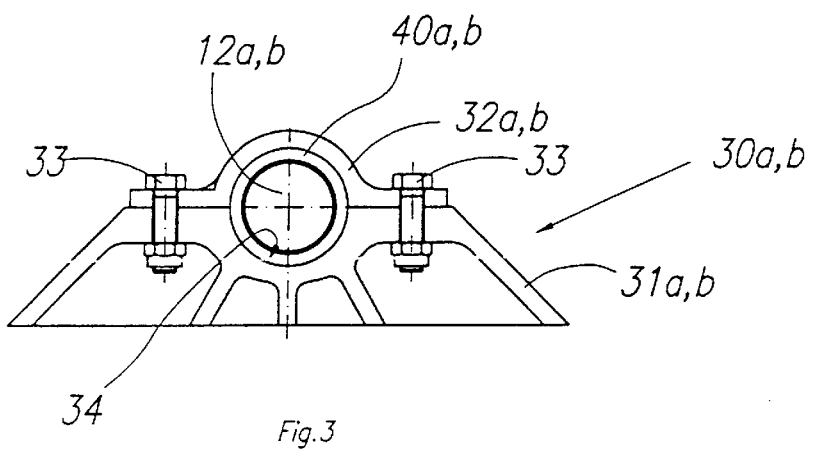
FIG. 3, a side view of a bearing pedestal.
Figure 4:
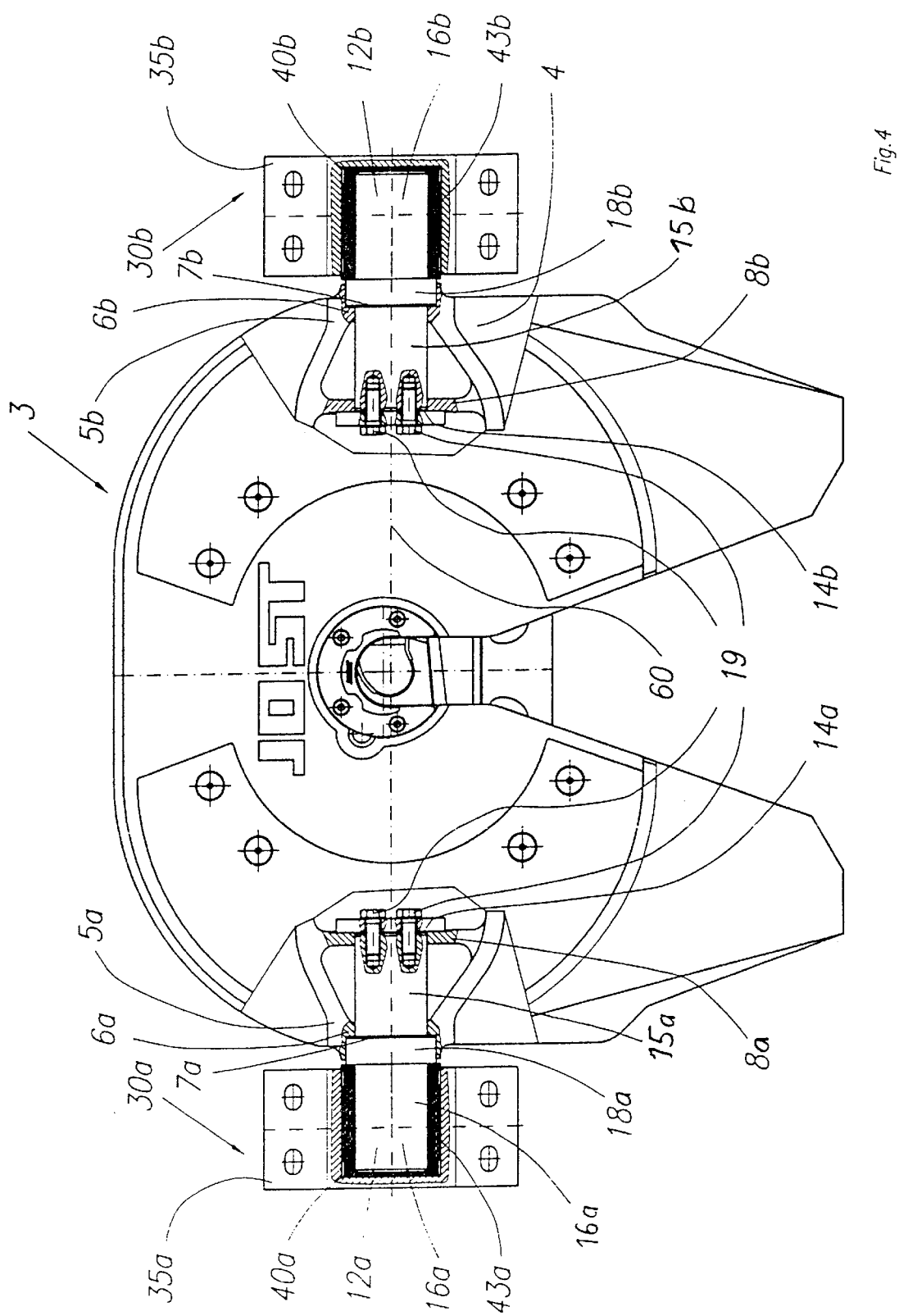
FIG. 4, the top view of a fifth wheel, partly in cross section, according to another embodiment, FIG. 5, a side view of a bearing pedestal according to another embodiment, FIG. 6, a vertical section through a bearing pedestal according to another embodiment, FIG. 7, a top view of a fifth wheel according to another embodiment, and FIG. 8, the side view of a pivot pin.

In FIGS. 1–3, it can be seen that the pivot pins 12a,b carry bushings 40a,b, which can be fashioned as bearing bushings. Preferably, a plastic material is used that has good sliding properties with respect to the pin material, so that the fifth wheel 3 can swing about the horizontal axis 60. FIG. 4 shows another embodiment of a fifth wheel 3, which likewise has detachably secured pivot pins 12a,b, in which the fastening is visible thanks to the partly exploded view. The pivot pins 12a,b have a bearing segment 16a,b, which rests on the bearing pedestal 30a,b and carries the bushing 40a,b. In the embodiment shown here, the bushings 40a,b additionally have rubber inserts 43a,b on their outside, which project slightly radially outward from the surface of the bushing 40a,b. These rubber inserts are compressed during installation, so that the bearing bushing 40a,b in which the pivot pins 12a,b is immovably secured.

The fastening segment 15a,b protrudes into the fifth wheel 3. The frame 4 of the coupling plate 10 has an opening 6a,b in its outer wall 5a,b, through which the pivot pin 12a,b extends. This opening 6a,b has a shoulder 7a,b, against which rests a flange 18a,b formed on the pivot pin 12a,b. The fastening segment (15a,b) is greater than or equal to a protruding length of the bearing segment (16a,b).

The rear end face 14 is fastened by means of screws 19 to a web 8a,b of the frame 4. The bearing bolts 12a,b are thus secured to the fifth wheel at two fastening points, so that the forces acting on the fifth wheel 3 can be channeled into the bearing pedestals 30a,b , without the pivot pins 12a,b becoming noticeably deformed, even in extreme situations.

Figure 5:
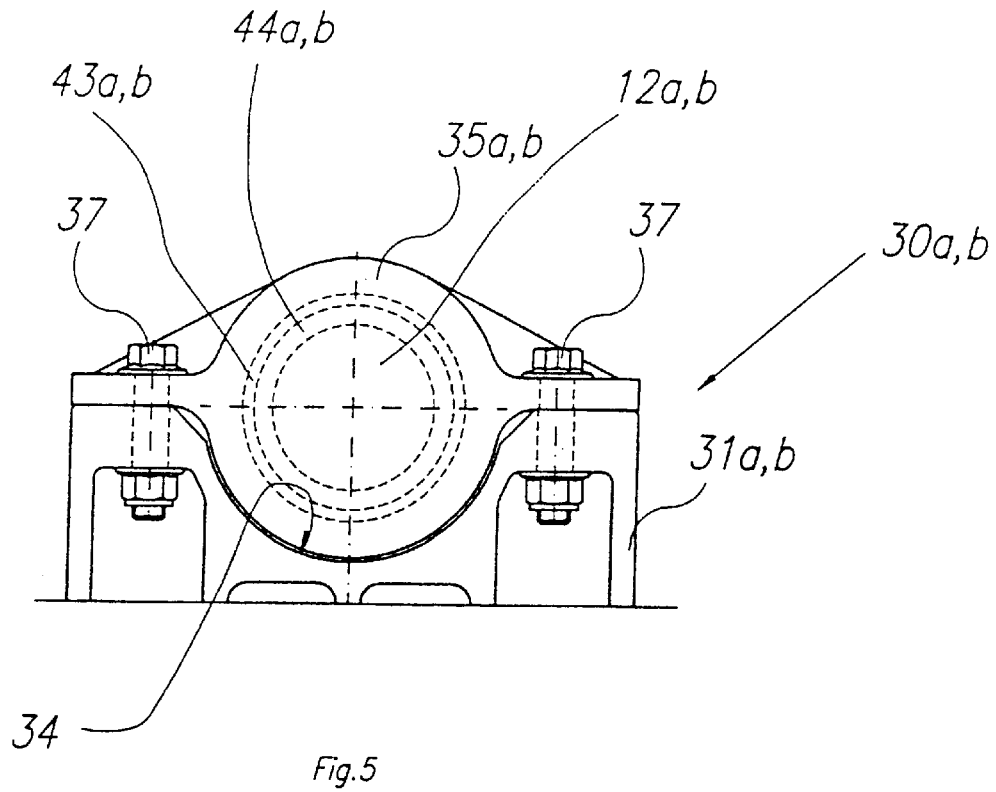

FIG. 5 shows the side view of a bearing pedestal 30, whose bottom piece 31 has a semicircular recess 34. The top of the bearing pedestal 30a,b is formed by a bearing cap 35a,b, whose outer contour is adapted to the shape of the recess 34. The bearing cap 35a,b embraces the pivot pin 12a,b and thus can be preassembled. The bearing cap 35a,b is secured by means of screws 37 on the bottom piece 31 of the bearing pedestal 30a,b. The pivot pins 12a,b and the bushings 40a,b with the inserts 43a,b are drawn hatched in FIG. 5.

Figure 6:
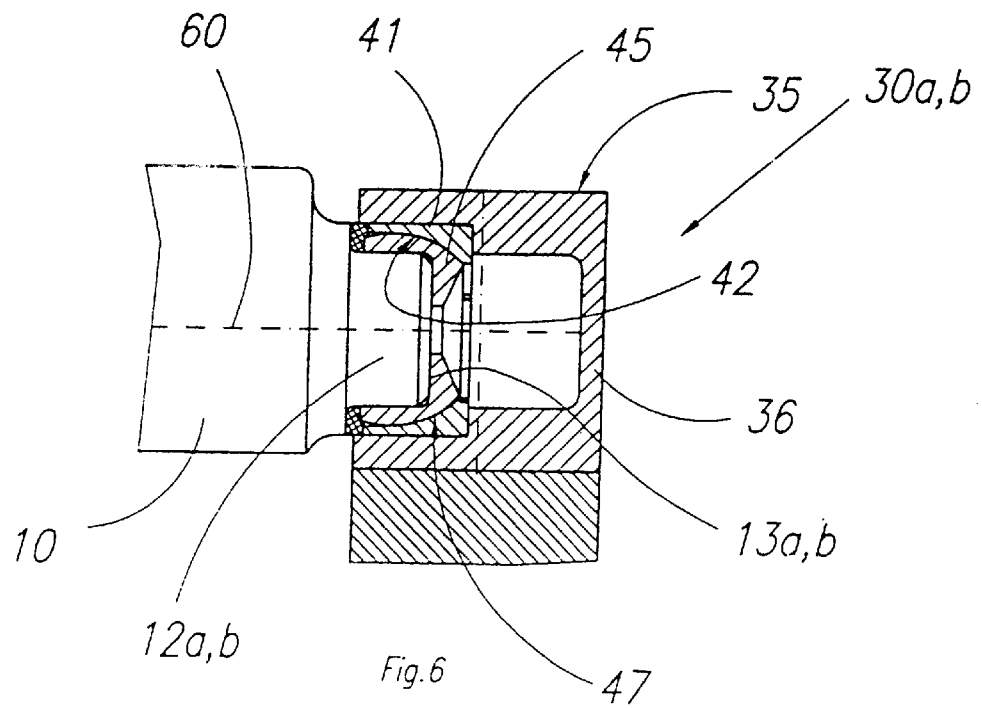

FIG. 6 shows a cross section through a bearing pedestal 30a,b according to another embodiment. The pivot pin 12b, which has a cylindrical outer contour, carries an extruded part 45, which has a spherical surface 47. In the bearing cap 35 is placed a bushing 41, which likewise has a corresponding spherical inner surface 42, being adapted to the spherical surface 47. Manufacturing tolerances in the axial direction (in the direction of the swivel axis 60) can be easily compensated in this way. It should be noted that the bearing bolt 12*b* does not rest with its end surface 13*b* against the front wall 36 of the bearing cap 35.

Figure 7:
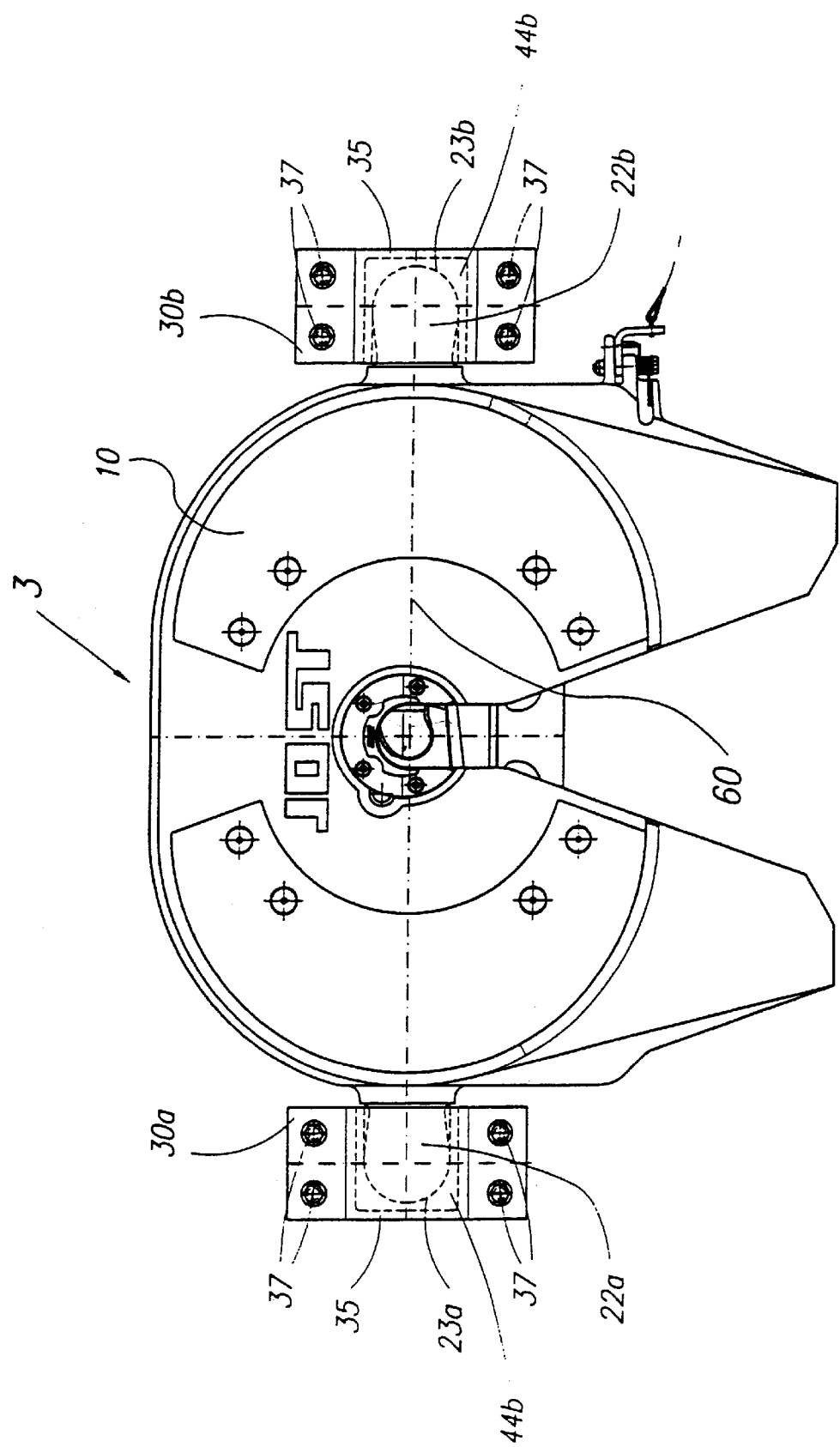

FIG. 7 shows another embodiment in which the pivot pins 22*a,b* have a circular cross section, tapering in the direction of the coupling plate 10. The end face 23*a,b* is rounded off, so that the pivot pin 22*a,b* has a generally drop-shaped form. Inside the bearing cap 35 there is placed a bearing insert 44*a,b* of elastic material, embracing the pivot pins 22*a,b*.

Figure 8:
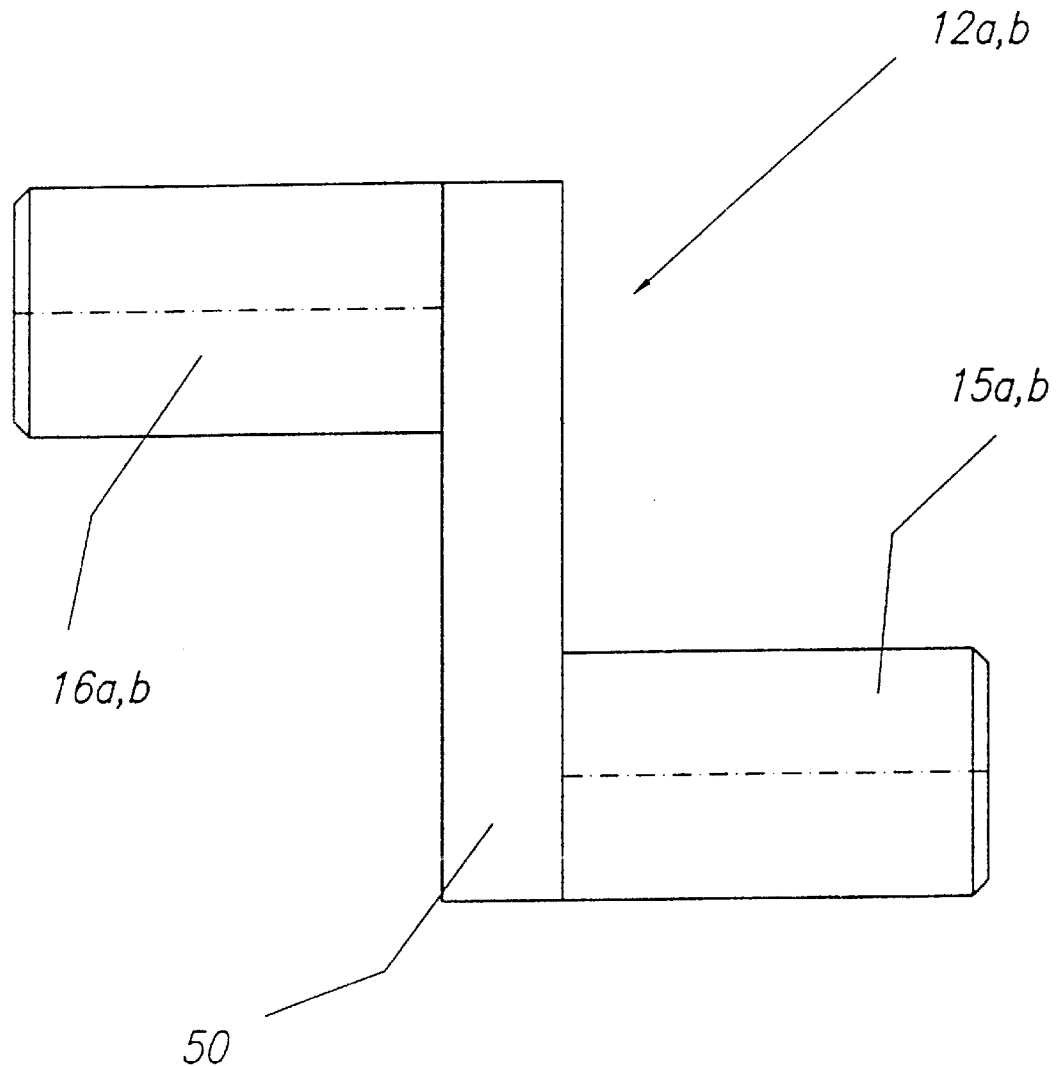

FIG. 8 shows an embodiment of a replaceable pivot pin 12*a*, in which the fastening segment 15*a* and the bearing segment 16*a* are offset from each other. The connection is produced by a middle segment 50. This embodiment is suitable for applications in which the fifth wheel is supposed to be arranged as deep as possible in the vehicle frame 1.

LEGEND

| | |
|---|---|
| 1 | Vehicle frame |
| 2a,b | Longitudinal beam |
| 3 | Fifth wheel |
| 4 | Frame |
| 5a,b | Outer rim |
| 6a,b | Opening |
| 7a,b | Shoulder |
| 8a,b | Web |
| 10 | Coupling plate |
| 11a,b | Side surface |
| 12a,b | Pivot pin |
| 13a,b | Front end face |
| 14 | Rear end face |
| 15a,b | Fastening segment |
| 16a,b | Bearing segment |
| 18a,b | Flange |
| 19 | Screws |
| 22a,b | Pivot pin |
| 23a,b | End face |
| 30a,b | Bearing pedestal |
| 31 | Bottom piece |
| 32a,b | Half-clip |
| 33 | Screw |
| 34 | Recess |
| 35a,b | Bearing cap |
| 36 | Front wall |
| 37 | Screw |
| 40a,b | Bushing |
| 41 | Bushing |
| 42 | Spherical surface |
| 43a,b | Insert |
| 44a,b | Bearing insert |
| 45 | Extruded part |
| 46 | Top |
| 47 | Spherical surface |
| 50 | Middle segment |
| 60 | Horizontal axis |

What is claimed is:

1. A fifth wheel for mounting to a vehicle frame comprising;
   a coupling plate;
   two pivot pins detachably connected to said plate at two diametrically opposite points at sides of said coupling plate said pins projecting out to the side beyond the coupling plate, said pins having a bearing segment and a fastening segment, each said pivot pin being detachably fastened to at least two points to said coupling plate wherein the fastening segment is fastened at a free end face of a said pivot pin to the coupling plate and additionally held by the coupling plate at an end near the bearing segment; and
   at least one pair of bearing pedestals, said bearing pedestals adapted to be mounted to the frame of a vehicle, each of said pivot pins operably connected to a said separate bearing pedestal.

2. A fifth wheel according to claim 1, wherein the fastening segment is screwed at a free end face to said coupling plate and is additionally held by said coupling plate at an end near the bearing segment.

3. A fifth wheel according to claim 1, wherein the fastening segment having a protruding length that is greater than or equal to in length than a length of the bearing segment of said pivot pin.

4. A fifth wheel according to claim 1, wherein the fastening segment and the bearing segment of the pivot pin are arranged at an offset.

5. A fifth wheel according to claim 4, wherein the pivot pins have a cylindrical shape.

6. A fifth wheel according to claim 1, wherein the pivot pins carry a bushing.

7. A fifth wheel according to claim 1, wherein the pivot pins carry an extruded part, which has a spherical or ball-shaped surface.

8. A fifth wheel according to claim 1, wherein the pivot pins have a round end face.

9. A fifth wheel according to claim 1, wherein said pair of bearing pedestals accommodates a respective pivot pin of the fifth wheel, said at least one of said pair of bearing pedestals having a bottom piece with a recess located on a top side thereof, and at least one holding element detachably secured to the bottom piece.

10. A fifth wheel according to claim 9, wherein the recess is semicircular.

11. A fifth wheel according to claim 9, wherein the holding element is a half-clip.

12. A fifth wheel according to claim 9, wherein the holding element is a bearing cap embracing the pivot pin.

13. A fifth wheel according to claim 12, wherein an inner contour of the bearing cap is adapted to a shape of the pivot pin and an outer contour to a shape of the recess.

14. A fifth wheel according to claim 12, wherein the bearing cap comprises an inserted bushing with a spherical or ball surface.

15. A fifth wheel assembly for a vehicle frame comprising:
    a coupling plate;
    at least one pivot pin, said at least one pivot pin having a bearing segment and a fastening segment and, said at least one pivot pin detachably fastened through said fastening segment to said coupling plate; and
    at least one bearing pedestal, said at least one bearing pedestal adapted to be mounted to the frame of a vehicle, and said at least one pivot pin operably connected through said bearing segment to said at least one bearing pedestal.

16. A fifth wheel assembly according to claim 15, wherein said fastening segment and said bearing segment of said pivot pin of arranged at an offset.

17. A fifth wheel assembly according to claim 16, wherein said assembly further comprises a bushing or extruded part, said bushing or extruded part operably connected to said pivot pin.

\* \* \* \* \*